United States Patent [19]

Vaill

[11] 4,113,042
[45] Sep. 12, 1978

[54] MANUAL CONTROL HANDLE FOR ELECTRIC VEHICLE

[75] Inventor: Ronald E. Vaill, Penn Township, Allegheny County, Pa.

[73] Assignee: Westinghouse Electric Corp., Pittsburgh, Pa.

[21] Appl. No.: 737,366

[22] Filed: Nov. 1, 1976

[51] Int. Cl.² .......................................... B62D 51/04
[52] U.S. Cl. ................ 180/19 H; 74/471 XY; 180/77 H; 200/61.85; 200/157
[58] Field of Search ............ 180/19 H, 77 H, 77 HT, 180/65 R; 280/DIG. 5; 200/6 A, 61–85, 157; 74/471 XY, 491

[56] References Cited

U.S. PATENT DOCUMENTS

| 2,399,605 | 4/1946 | Schroeder | 180/19 H X |
| 2,706,008 | 4/1955 | Voigt | 280/DIG. 5 |
| 2,840,175 | 6/1958 | Ulinski | 180/19 H |
| 2,962,106 | 11/1960 | Burnside | 180/19 H |
| 3,190,994 | 6/1965 | Becker | 180/19 H X |
| 3,199,621 | 8/1965 | Seaman | 280/DIG. 5 |
| 3,465,841 | 9/1969 | Polskamp | 180/65 R |
| 3,557,893 | 1/1971 | Kohls | 180/19 H |
| 3,565,199 | 2/1971 | Mistarz | 180/19 H |
| 3,753,473 | 8/1973 | Hollis | 180/19 H |

*Primary Examiner*—Kenneth H. Betts
*Assistant Examiner*—Terrance L. Siemens
*Attorney, Agent, or Firm*—James J. Wood

[57] ABSTRACT

The disclosure relates to a manual control handle for an electrically powered utility vehicle. The handle provides three functions for the vehicle: steering guidance, speed selection and directional control (forward or reverse). These functions are so designed into the handle that the operator is able to use the handle to control the vehicle without training and with a high degree of safety.

8 Claims, 9 Drawing Figures

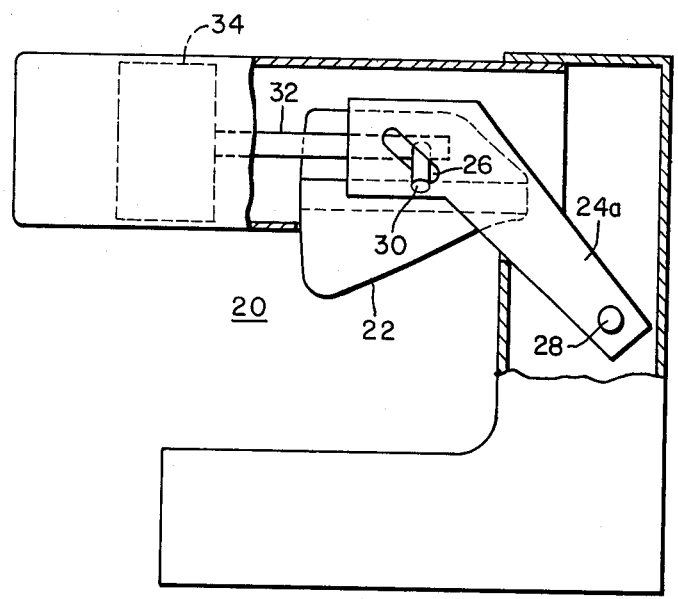
FIG. 2A
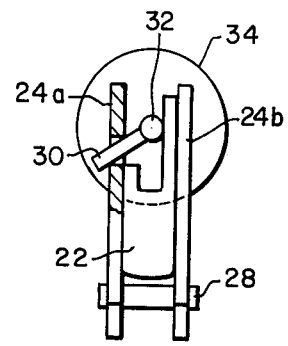
FIG. 2B
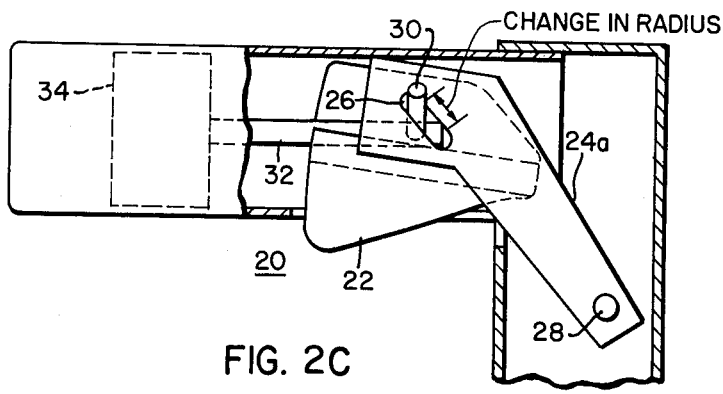
FIG. 2C
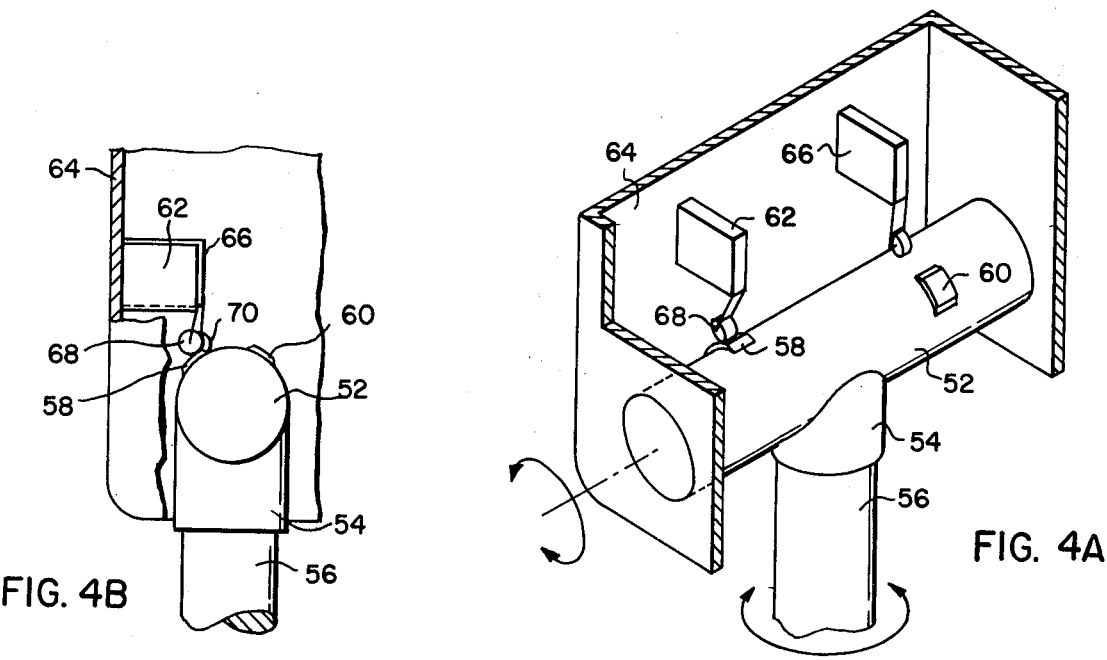
FIG. 4B
FIG. 4A

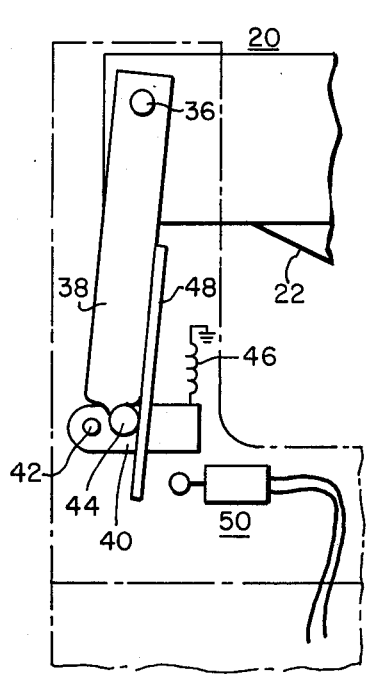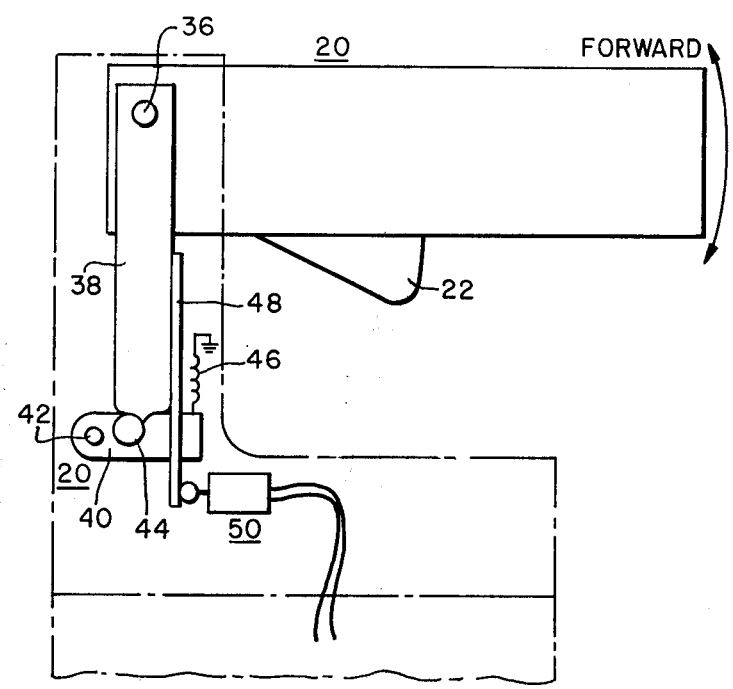
FIG. 3B  FIG. 3A
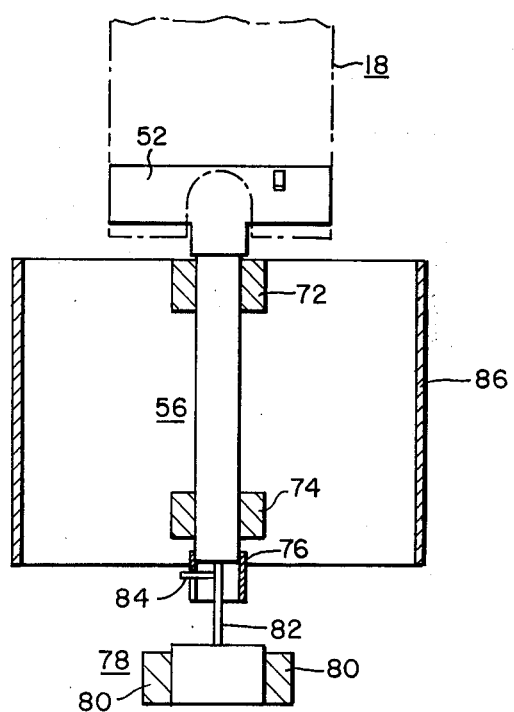
FIG. 5

MANUAL CONTROL HANDLE FOR ELECTRIC VEHICLE

BACKGROUND OF THE INVENTION

1. Field of the Invention

This invention relates to a manual control handle for an electrically operated vehicle.

2. Description of the Prior Art

There are numerous handles in present use for the manual control of powered vehicles; most of these provide one or more features such as steering or directional control. In almost all of these devices there is a degree of complexity which requires some operator training prior to utilization.

The present invention combines three functions: steering guidance, speed selection and directional control in a novel manual control handle, so designed that the user requires relatively little prior training. Additionally, by virtue of its construction there is a high degree of safety in every day operation.

SUMMARY OF THE INVENTION

A handle for the manual control of an electrical traction vehicle is provided in which means for speed selection are pivoted at one end and mounted on the handle. The pivoted means has a slotted portion. Means for leverage, having a free end and a secured end, extend into the slotted portion. Means for potential selection are connected to the secured end of the leverage means, providing rotary displacement upon actuation of the lever means. Rotation of the speed selection means by the user, displaces the leverage means to provide a voltage control signal for the traction vehicle which is a function of the rotational displacement of the potential selection means.

Forward and reverse selection is provided by a pivotally mounted cam means located on a gripping means which is integral with the handle. The pivotally mounted cam means defines forward and reverse stable positions. Follower means are biased against the cam surface so as to be at rest in either stable position. Resilient means mounted in the cam means is in make and break contact with switching means to define forward and reverse control signals.

The handle also defines the automatic and manual modes of operation for the vehicle. A horizontal rotational means is supported on the handle, the rotational means having two cammed surfaces which are arranged for mating contact with switches supported on the handle. When the handle is vertical, one switch is in mating control with one of the cammed surfaces. As the handle is rotated from the vertical, the other switch comes in mating contact with the other cam surface to define the normal operating range in the manual mode.

Steering guidance for the vehicle is provided by a vertical pivot means on the handle and a potential selection means mounted coaxially with the vertical pivot means. Upon rotation of the handle about the vertical pivot means, the potential selection means provides a voltage control signal which is a function of the angular displacement of the vertical pivot means.

BRIEF DESCRIPTION OF THE DRAWINGS

FIG. 2A is a plan view of the proportional speed control mechanism of the invention incorporated in the handle grip;

FIG. 2B is a side elevational view of the proportional speed control mechanism of FIG. 2A, showing the trigger, roller pin in cooperating relationship with the shaft of the potentiometer;

FIG. 2C is a partial schematic view showing the position of the roller pin of the proportional speed control mechanism at maximum speed selection;

FIG. 3A is a plan view of the directional control mechanism of the invention incorporated into the handle grip, showing the position of the component parts for forward displacement of the vehicle;

FIG. 3B is a partial schematic of the directional control mechanism showing the position of the component parts for reverse displacement of the vehicle;

FIG. 4A is a pictorial view of the horizontal and vertical pivot controls of the steering mechanism in accordance with the invention;

FIG. 4B is a side view of the steering mechanism of FIG. 4A; and

FIG. 5 is a schematic plan view of the vertical pivot of the steering mechanism in accordance with the invention.

DESCRIPTION OF PREFERRED EMBODIMENT

Figure 1:
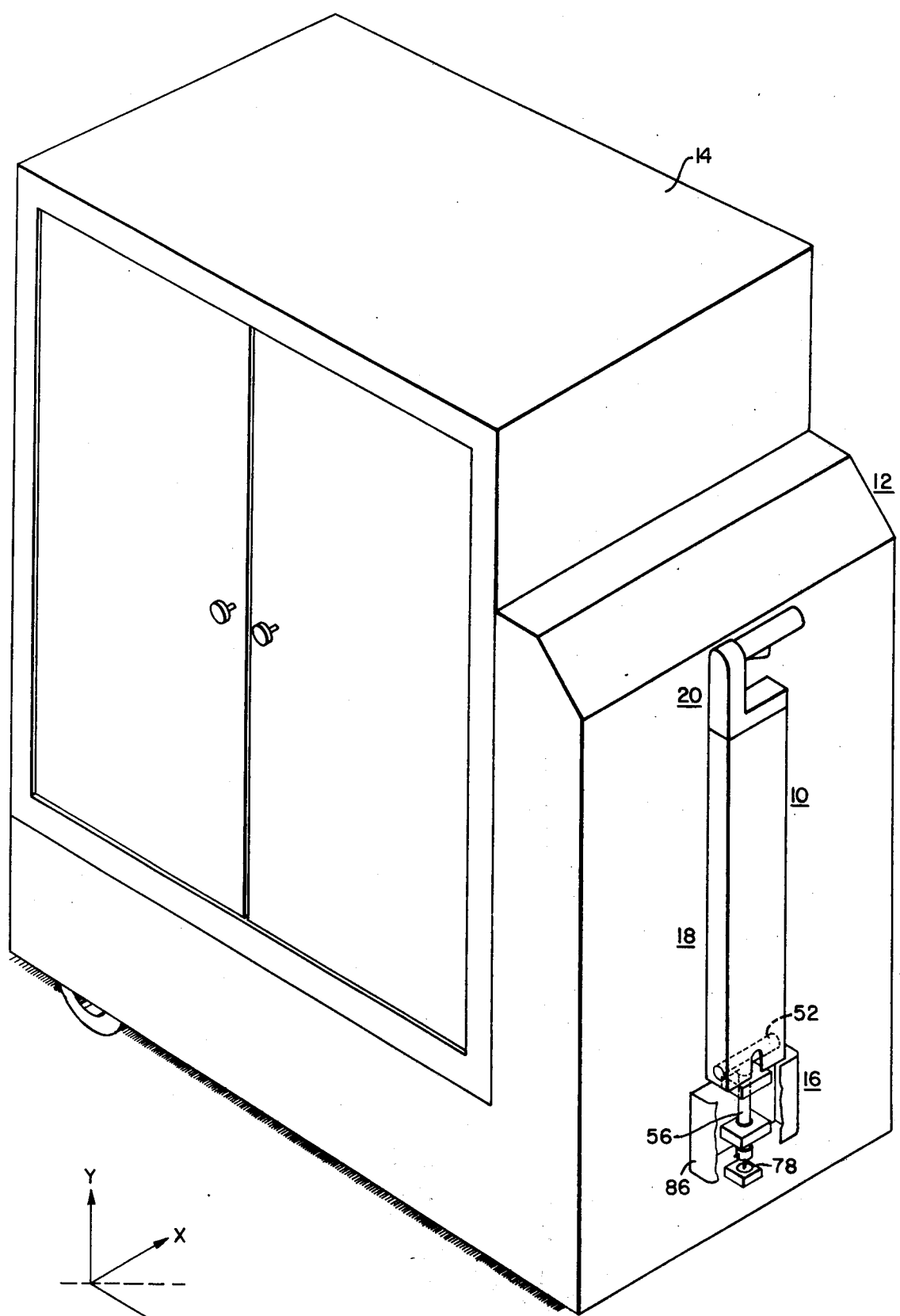
FIG. 1 is a pictorial view showing the handle of the invention positioned on an electric traction vehicle.

Referring now to FIG. 1, the manual handle of the invention, indicated generally at 10, is utilized with an electrical traction vehicle, indicated generally at 12, which may be operated automatically or manually. In the automatic mode, the handle 10 is in the vertical position, and the vehicle 12 is in two-way radio communication with a central traffic controller, communication being had by means of a plurality of segmented closed loop antennas embedded beneath the surface along which the vehicle is to travel, the plurality of looped antennas defining the path of travel. The vehicle 12 may carry a modular load 14 which can be mechanically removed (by means not shown) at the destination.

The handle 10 in the position shown in FIG. 1, is in the stored or automatic mode position. In the manual mode the handle is initially displaced in the Y–Z plane, thereafter, it may be displaced in three directional space to affect changes in handle attitude reflecting changes in steering as well as adjustments in the height at which the handle is held for the convenience of the operator.

The handle 10 has three major functions to provide for the vehicle: steering guidance, speed selection, and directional control (forward or reverse). Since the traction vehicle 12 is to be utilized by relatively inexperienced personnel it is a prime requisite that the handle be simple in operation with a high degree of safety.

The handle 10 comprises a main pivot assembly indicated generally at 16, a stem indicated generally at 18, and a grip indicated generally at 20.

The stem 18 is a hollow member which attaches to the main pivot assembly 16 and provides an attachment means for the grip 20. Additionally, the stem 18 provides a wireway for the electrical wires to the grip 20.

The grip 20, shown schematically in FIGS. 2A, 2B and 2C, provides proportional speed control for the traction vehicle 12. In the interests of simplicity only the main components are shown. A trigger 22 is attached by screws (not shown) to side plates 24a and 24b, plate 24a being slotted at 26. The trigger 22 and side plate 24a are pivoted at 28 (FIG. 2A). A roller pin 30 is pressed into the shaft 32 of a potentiometer shown in dotted outline at 34. As the trigger 22 is squeezed by the operator, the roller pin 30 moves in the slot 26 to provide a variable change in radius about pivot 28. As the roller pin 30 moves, it imparts rotary displacement to the shaft 32 of the potentiometer 34. The wiper (not shown) coupled with the shaft 32 provides an increasing control voltage which is applied to the electronic circuitry, (not shown), controlling the traction motor of the vehicle, the greater the control voltage the higher the speed of the vehicle, and conversely.

As previously stated, when the handle 10 is in the vertical position, the vehicle 12 is in the automatic mode and manual operation is not possible. As will be explained in the description of FIGS. 4A and 4B when the handle 10 is displaced to the normal range for manual operation, (which is about 20°-60° from the vertical) normal operating range switch 66 (FIGS. 4A and 4B) is actuated and this energizes the potentiometer 34.

The speed mechanism of FIGS. 2A, 2B and 2C provides proportional speed control, with the arrangement being that, the more the trigger 22 is squeezed, the faster the vehicle 12 will go in the selected direction until maximum speed is reached. The position of the roller pin 30 at maximum speed is depicted in FIG. 2C. By properly dimensioning the slot 26, the magnitude of the control voltage can be disciplined, thus placing a limit on the maximum speed of the vehicle 12; this is a safety feature.

Additionally, the acceleration of the vehicle is limited electronically, so that if the user should squeeze the trigger suddenly, the vehicle will accelerate gradually and will not jerk. Similarly, the deceleration rate is also controlled electronically, so that if the operator suddenly releases the trigger 22, the vehicle will come to a stop quickly and smoothly.

The forward and reverse mechanism for the handle 10 is shown schematically in FIGS. 3A and 3B. The grip 20 has a pivot at 36 which supports a cam member 38. A member 40, pivoted at 42, carries a roller follower 44 which is biased by means of spring 46 against the cam surface of member 38. The cam member 38 also carries a leaf spring 48. A forward-reverse switch is indicated symbolically at 50.

The cam member 38 has only two stable positions, that is, the roller follower either assumes the position shown in FIG. 3A (forward) or the position shown in FIG. 3B (reverse). When the operator desires the vehicle to move forward, the grip 20 is pulled toward him, or in an upward direction as shown in FIG. 3A, and the slight rotation about the pivot 36 causes the roller follower 44 to move to one side of the cam surface. As viewed in FIG. 3A, the roller follower 44 is on the left side, and the leaf spring engages switch 50. When the grip 20 is pushed away from the user, or in a downward direction as shown in FIG. 3A, the roller follower 44 is on the right as shown in FIG. 3B, the switch 50 is not engaged by the spring 48 and the vehicle 12 moves in the reverse direction. The position of the switch 50 determines the polarity of the control signal sent to the electronic control circuitry. The leaf spring 48 engages the switch 50 in the forward position only. Compliance of the leaf spring 48 allows for imprecise action of the grip 20; this may come about from wear or from non-exact set up.

As stated earlier when the handle 18 is in the vertical position as shown in FIG. 1, the handle is operational in the automatic mode and manual operation is not possible. The main pivot assembly 16 is shown schematically in FIGS. 4A, 4B and in FIG. 5. A horizontal pivot 52 is welded at 54 to a vertical pivot 56, so that each is free to rotate about its respective axis.

Referring back to FIG. 1 for a moment, the vertical pivot 56 always remains in the Y direction, that is, it has rotational displacement about the Y axis. The horizontal pivot 52 always lies in the X-Z plane, and in the automatic mode the horizontal pivot 52 is in the X direction. The horizontal pivot 52 contains cam projectors at 58 and 60 as shown in FIGS. 4A and 4B. The cam projection 58 cooperates with a vertical position indicia means, represented by switch 62 on the support bracket 64, while the cam projection 60 cooperates with normal operating range indicia means, represented by switch 66, also mounted on support bracket 64. The switches 62 and 66 include followers 68 and 70 respectively. In the position shown in FIGS. 4A and 4B, the handle 10 is up, and the follower 70 is not engaging the cam projection 60. The vehicle 12 is now in the automatic mode and cannot be operated manually. When the handle is pulled down (about 20° from the vertical) the follower 70 engages cam projector 60 and the vehicle 12 can now be operated manually.

The handle 10 is also rotated about the vertical pivot 56. As shown in FIG. 5, the vertical pivot 56 is mounted in support bearings 72 and 74. A slotted coupling 76 is secured to the lower end of vertical pivot 56. A potentiometer, indicated generally at 78, and supported in a mounting bracket 80, has a shaft 82 which is mounted coaxially with vertical pivot 56 by means of a pin 84 which engages the slot in coupling 76 and has the other end pressed into the shaft 82. The support bracket for the vertical pivot 56 is identified at 86.

Steering guidance is thus provided in the handle by the angular displacement of the vertical pivot 56. The potentiometer 78 provides the interface between the steering angle of the handle and the servo system which steers the vehicle. Provision is made in the electronics to modify the speed of the vehicle as a function of the steering angle, under manual control only. This is necessary because the apparent speed of the handle 10 changes with the steering angle. If the rear wheels of the vehicle are driven at a constant average speed (through a differential), then the speed of the front wheel is equal to the speed of the rear wheels only when the steering angle is straight ahead. If the steering angle were either a maximum (of 60°) to the left or right, the speed of the front wheel would be twice the straight ahead speed. If not corrected, this would force the operator to move considerably more quickly at corners than on straight sections and would detract from the maneuverability of the vehicle.

The handle 10 can be pulled all the way down until the grip touches the floor, thus eliminating any strength problems that would be encountered if stops were built into the horizontal pivot 52. The handle 10 is also spring balanced to automatically return to the vertical straight ahead position when released.

The handle 10 possesses a high degree of safety for the operator with these features:

(a) push/pull control for forward/reverse selection
(b) normal operating range limit switches
(c) infinite speed control
(d) controlled acceleration and deceleration, and
(e) speed reduction around corners The handle also possesses a high degree of mechanical reliability with these features:

(a) no internal stops to break when the handle is pushed all the way to the floor, and
(b) modular design of grip, main stem and pivot assemblies for rapid replacement in service, and
(c) sealed electronic components housed in heavy guage enclosures to prevent damage from corrosion or mechanical abuse.

I claim:

1. Apparatus for manual control of an electric traction vehicle comprising:
   means for speed selection pivoted at one end on said vehicle and having a slotted portion thereon;
   leverage means having a free end extended within said slotted portion, and a secured end;
   means for electrical potential selection, connected to said secured end of said leverage means, for rotary displacement upon actuation of said leverage means, with said rotary displacement defining a voltage control signal, whereby rotation of said speed selection means by the user displaces said leverage means to provide said voltage control signal for said traction vehicle.

2. Apparatus according to claim 1 wherein the slotted portion of said speed selection means is dimensioned to define the maximum excursion of said leverage means.

3. Apparatus according to claim 1 wherein said electrical potential selection means is a rotary potentiometer having a shaft, the shaft being connected to said leverage means at said secured end.

4. Apparatus for manual selection of forward and reverse displacement for an electric traction vehicle comprising:
   hand gripping means integral with said apparatus;
   means pivotally mounted on said gripping means and having a cammed surface defining forward and reverse stable positions;
   cam following means, biased against said cammed surface so as to rest in either of said stable positions;
   resilient means on said cammed surface and displaceable therewith; and
   means for switching arranged for make and break physical contact with said resilient means, whereby when said gripping means is rotatably displaced, said cammed means is pivoted into one of its stable positions, the position of said switching means defining forward and reverse control signals respectively for said traction vehicle.

5. Apparatus according to claim 4 wherein said gripping means is a tubular member.

6. Apparatus according to claim 4 wherein said resilient means is a leaf spring having a compliance which allows for imprecise action of said gripping means.

7. A handle for manual steering control of an electrical traction vehicle comprising:
   rotational means vertically pivoted on said handle;
   means for electrical potential selection mounted on said handle coaxially with said vertical rotational means, for rotational displacement therewith, whereby upon displacement of said handle about said vertically pivoted means, said potential selection means provides a voltage control signal which is a function of the magnitude of the rotational displacement thereof.

8. A handle according to claim 7 wherein said electrical potential selection means is a rotary potentiometer having a shaft secured to and mounted coaxially with said vertically pivoted rotational means.

* * * * *